United States Patent [19]

Dejonghe et al.

[11] Patent Number: 4,833,048

[45] Date of Patent: May 23, 1989

[54] METAL-SULFUR TYPE CELL HAVING IMPROVED POSITIVE ELECTRODE

[75] Inventors: Lutgard C. Dejonghe; Steven J. Visco; Catherine C. Mailhe, all of Berkeley, Calif.; Michel B. Armand, St. Martin D'Uriage, France

[73] Assignee: The United States of America as represented by the United States Department of Energy, Washington, D.C.

[21] Appl. No.: 175,782

[22] Filed: Mar. 31, 1988

[51] Int. Cl.⁴ ............................................. H01M 4/60
[52] U.S. Cl. .................................... 429/104; 429/213
[58] Field of Search ................................ 429/104, 213

[56] References Cited

U.S. PATENT DOCUMENTS

| | | | |
|---|---|---|---|
| 4,002,807 | 1/1977 | Ludwig | 429/104 |
| 4,018,969 | 4/1977 | Fischer et al. | 429/104 |
| 4,020,246 | 4/1977 | Seo et al. | 429/104 |
| 4,181,779 | 1/1980 | Teo | 429/213 |
| 4,184,013 | 1/1980 | Weddigen et al. | 429/104 |
| 4,357,399 | 11/1982 | Auborn et al. | 429/104 |
| 4,375,427 | 3/1983 | Miller et al. | 429/213 |
| 4,469,761 | 9/1984 | Bennett et al. | 429/50 |
| 4,510,217 | 4/1985 | Kagawa et al. | 429/104 |
| 4,556,617 | 12/1985 | Kruger | 429/196 |
| 4,578,325 | 3/1986 | Gotou et al. | 429/91 |
| 4,609,600 | 9/1986 | Heinze et al. | 429/197 |
| 4,664,991 | 5/1987 | Perichaud et al. | 429/213 |

*Primary Examiner*—Donald L. Walton
*Attorney, Agent, or Firm*—L. E. Carnahan; Roger S. Gaither; William R. Moser

[57] ABSTRACT

An novel metal-sulfur type cell operable at a temperature of 200° C. or less with an energy density of 150 Whrs/Kg or better is disclosed characterized by an organo-sulfur cathode formed from an organic-sulfur compound having the general formula, in its charged state, of $(R(S)_y)_n$ wherein y=1 to 6; n=2 to 20; and R is one or more different aliphatic or aromatic organic moieties having 1 to 20 carbon atoms, which may include one or more oxygen, sulfur, or nitrogen heteroatoms when R comprisises one of more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon.

24 Claims, 4 Drawing Sheets

METAL-SULFUR TYPE CELL HAVING IMPROVED POSITIVE ELECTRODE

BACKGROUND OF THE INVENTION

The invention described herein arose in the course of, or under, Contract No. DE-AC03-76SF00098 between the United States Department of Energy and the University of California.

This invention relates to metal-sulfur type cells. More particularly, this invention relates to a metal-sulfur type cell having a novel positive electrode comprising an organo-sulfur compound.

Batteries are an integral part of modern society, with applications ranging from flashlights to computer memory backup. Successful development of advanced battery systems can make possible the realization of such applications as electric automobiles and utility load-leveling. Electric vehicles have, in fact, been made using conventional lead-acid batteries, but the range of travel has been insufficient due to the relatively low specific energy of the secondary cells in the batteries. Advanced battery systems offer the possibility of both high specific energy and power. Various systems are attractive candidates for electric vehicle, solar, and load-leveling applications; each of which has its advantages as well as technical barriers.

Batteries made using metal-sulfur type cells, e.g., sodium-sulfur cells, are well known, and attractive, because of the theoretically high power to weight ratio. Considerable research and development has been carried out to satisfy the various requirements needed to make such an alkali battery system technically viable. However, one of the major technical barriers encountered is the need for high operating temperatures needed to maintain both the alkali metal anode, e.g., sodium, as well as the sulfur-containing cathode, in molten form to enhance the conductivity. High operating temperatures invariably lead to corrosion problems and/or cell-breakdown on cooling, as well as energy losses due to regulation of the cell temperature.

It has been proposed to lower the operating temperature of such a cell by using an organic solvent in connection with the cathode material. Fischer et al U.S. Pat. No. 4,018,969 suggests dissolving the inorganic sulfuralkali metal compounds in the cathode chamber in an organic liquid solvent in a cell which is operated in a temperature range of 100°–200° C.

The use of organic solvents in the cathode portion of metal-sulfur type cells, such as alkali metal-sulfur cells, is also discussed in Seo et al U.S. Pat. No. 4,020,246 and in Heinze U.S. Pat. No. 4,609,600 while Bennett et al U.S. Pat. No. 4,469,761 mentions prior art use of organically based electrolytes in such cells.

The Seo et al patent further describes the use of a liquid organic oxidizer which is in the organic solvent to form a liquid cathode and the Heinze et al patent states that the electrolyte may also include organic complex ligand possessing units of the general formula ($-X-CH_2-CH_2-$) wherein X is O, S, or NH.

The Heinze et al patent further describes the use of an n-doped polyacetylene solid organic cathode while Kruger U.S. Pat. No. 4,556,617 lists a number of organic cathode materials including polymeric materials such as the aforementioned polyacetylene as well as polyphenylene sulfide.

However, despite the various modifications which have been proposed in connection with metal-sulfur type cells, such as alkali metal-sulfur type cells, there remains a need for a metal-sulfur type cell having a cathode which permits operation at lower temperatures, i.e., at or below 200° C., preferably at or below 150° C., and more preferably at or below 100° C. which will reduce the corrosion problem and other problems associated with higher operating temperatures; has a high energy density, i.e., 150 watt hrs/Kg or better; and has increased chemical stability (resistance to degradation or polymerization).

SUMMARY OF THE INVENTION

It is, therefore, an object of this invention to provide a novel class of metal-sulfur type cells wherein the novelty comprises an organo-sulfur cathode which permits operation of the cell at a temperature of 200 C or less and results in theoretical energy densities of 350 to 800 Watt hours/Kg (Whrs/Kg), with maximum practical energy densities of 150 Whrs/Kg or better.

It is another object of this invention to provide a novel metal-sulfur type cell operable at a temperature of 200° C. or less with a practical energy density of 150 Whrs/Kg or better wherein the novelty comprises an organo-sulfur cathode formed from an organic-sulfur compound having the general formula, in its charged state, of $(R(S)_y)_n$ wherein $y=1$ to 6; $n=2$ to 20; and R is one or more different aliphatic or aromatic organic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon.

It is yet another object of this invention to provide a novel metal-sulfur type cell operable at a temperature of 200° C. or less with an energy density of 150 Whrs/Kg or better wherein the improvement comprises an organo-sulfur cathode formed from an organic-sulfur compound having the general formula, in its charged state, of $(R(S)_y)_2$ wherein $y=1$ to 6; and R is one or more different aliphatic or aromatic organic moieties having 1 to carbon 20 atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic branch or the aromatic ring may have substituted groups thereon.

It is still another object of this invention to provide a novel metal-sulfur type cell operable at a temperature of 200° C. or less with an energy density of 150 Whrs/Kg or better wherein the novelty comprises a liquid organo-sulfur cathode formed from an organic-sulfur compound having the general formula, in its charged state, of RCSS—SSCR' wherein R and R' are the same or different aliphatic or aromatic organic moieties having 1 to 19 carbon atoms, which may include one or more oxygen, sulfur, or nitrogen heteroatoms when R and/or R' comprise one or more aromatic rings, or one or more oxygen, sulfur, nitrogen, or fluorine atoms associated with the chain when R and/or R' comprise an aliphatic chain, wherein the aliphatic group may be linear or branched, saturated or unsaturated, and wherein either the aliphatic branch or the aromatic ring may have substituted groups thereon.

It is a further object of this invention to provide a novel metal-sulfur type cell operable at a temperature of 200° C. or less with an energy density of 150 Whrs/Kg or better wherein the novelty comprises a liquid organo-sulfur cathode formed from an organic-sulfur compound having the general formula, in its charged state, of RS—SR' wherein R and R' are the same or different aliphatic or aromatic organic moieties having 1 to 20 carbon atoms, which may include one or more oxygen, sulfur, or nitrogen heteroatoms when R and/or R' comprise one or more aromatic rings, or one or more oxygen, sulfur, nitrogen, or fluorine atoms associated with the chain when R and/or R' comprise an aliphatic chain, wherein the aliphatic group may be linear or branched, saturated or unsaturated, and wherein either the aliphatic branch or the aromatic ring may have substituted groups thereon.

These and other objects of the invention will be apparent from the following description and accompanying drawings.

DETAILED DESCRIPTION OF THE INVENTION

The novel metal-sulfur type cell of the invention comprises a metal anode, such as, for example, a sodium anode, in communication with an organo-sulfur cathode through an electrolyte. In one embodiment, the metal anode is in molten form and is separated from the organo-sulfur cathode, which may also be in liquid form, by a solid electrolyte barrier. However, it is within the scope of the invention that either or both the metal anode and the organo-sulfur cathode may be in solid form with, for example, either a liquid electrolyte or an elastomeric type electrolyte used when both the anode and cathode are in a solid form. By way of example, and not of limitation, a molten alkali metal-sulfur type cell which may contain the novel organo-sulfur cathode of the invention in liquid form is illustrated in FIG. 1.

Figure 1:
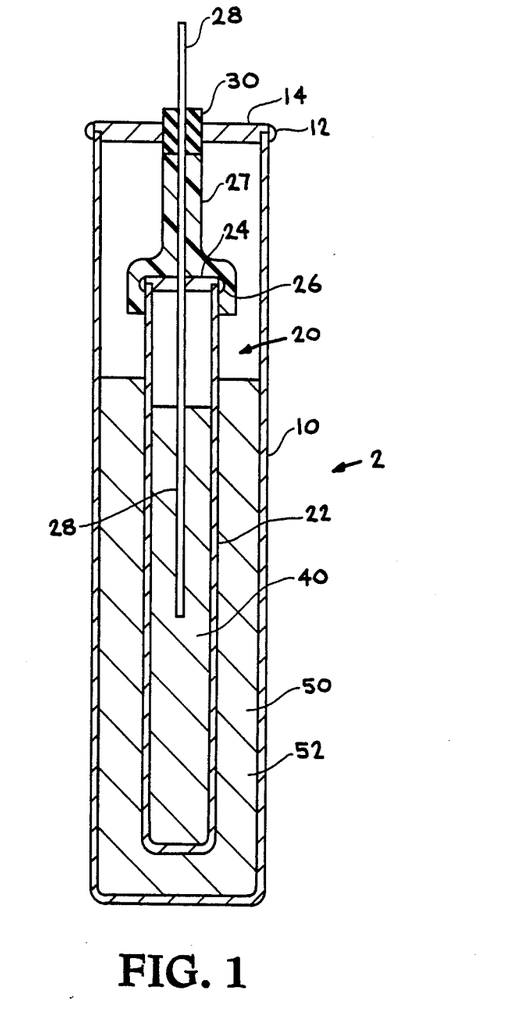
FIG. 1 is a vertical cross sectional view of the novel metal-sulfur type cell of the invention containing the organo-sulfur cathode of the invention.

The alkali metal-sulfur type cell generally illustrated at 2, in FIG. 1, comprises a metal case 10 made from a metal such as aluminum and having an aluminum cap 14 bonded thereto at 12 to facilitate assembly of the cell. Metal case 10 is in contact with the cathode material of the cell as will be described below and thus forms the positive electrode of the cell.

A negative electrode or anode 20 is centrally mounted within casing 10 comprising a cylinder 22 formed of beta alumina which acts as a solid electrolyte separator between the anode material and the cathode material. Cylinder 22 is filled with an alkali metal anode material 40, e.g., sodium, and sealed with a metal cap 24, e.g., an aluminum cap, using a sealant 26 such as an epoxy sealant capable of withstanding the operating temperature of the cell. Preferably, the epoxy sealant is, in turn, coated with a material 27 such as polytetrafluoroethylene (Teflon) which is inert or relatively inert to chemical attack by the organic materials used in forming the organo-sulfur cathode material.

A central electrode rod 28, which may comprise a stainless steel rod, is centrally disposed within cylinder 22 and passes through metal cap 24 and, via insulator 30, through the cap 14 of casing 10 to form the external negative terminal of cell 2.

The organo-sulfur cathode material 50 of the invention is placed within casing 10 around the solid electrolyte spacer cylinder 22 to provide electronic contact with casing 10 and ionic contact with cylinder 22. A conductive grid 52 such as, for example, a graphite felt may also be inserted in the space between casing 10 and cylinder 22 to enhance the current flow through the cathode material.

Solid electrolyte/separator 22 may comprise any ionically conductive glass or polycrystalline ceramic material which exhibits chemical resistance to molten alkali metal and which contain the alkali metal, e.g., sodium, which is to be ionically transported between the electrodes. A preferred type of material is beta alumina which comprises an aluminum oxide which also contains alkali metal atoms, usually sodium atoms, having the formula $M_2O.11Al_2O_3$ where M is the alkali metal. A particularly preferred form of beta alumina is B'' alumina which may be represented by the formula $M_2O.5Al_2O_3$ where M is the alkali metal. It will be noted that B'' alumina contains about twice as much of the alkali metal as the standard beta alumina (relative to the number of aluminum atoms).

Another material which may be used as the solid electrolyte/separator is "Nasicon" having the chemical formula $Na_{1+x}Zr_2Si_xP_{3-x}O_{12}$, where x=0-3. Solid electrolyte separators may also be constructed of ionically conductive glass such as, for example, $Na_2O.P_2O_5$ or $Na_2O.B_2O_3.SiO_2$. Alternatively, when either or both of the electrodes are formed from solid materials, the electrolyte may comprise a liquid such as, for example, 1,2-dimethyoxyethane, tetraethylsulfamide, or dimethylsulfoxide with dissolved alkali metal salts such as sodium diethyldithiocarbamate or sodium trifluoromethanesulfonate (sodium triflate).

The negative electrode of the metal-sulfur type cell may comprise any metal capable of functioning as a negative electrode in combination with the novel organo-sulfur positive electrode of the invention. Preferably, however, the negative electrode comprises one or more alkali metals. However, the negative electrode may also comprise one or more alkali metals in combination with one or more alkaline earth metals, or in combination with one or more other suitable metals.

A particularly preferred metal for the anode, when a liquid anode is desired, e.g., when a liquid cathode and a solid electrolyte are used, is sodium, or at least a sodium base alloy (i.e., at least 90 wt. % sodium) because of its low equivalent weight and its relative low melting point of 97.8° C. However, other alkali metals such as lithium or potassium, or mixtures of same with sodium may also be used, as desired, to optimize the overall system. Furthermore, mixtures of alkali metals with other metals such as, for example, alkaline earth metals, may also be used for the negative electrode. Preferably, however, these mixtures will contain sodium as one of the alkali metals for the reasons discussed.

Preferably, both the negative and positive electrodes are in the liquid state, both to achieve high rates of mass transport and to provide good electrical contact when a solid electrolyte separator such as a beta alumina solid electrolyte/separator is utilized. It is, therefore, preferable that the cell operate at a temperature of 200° C. or less, preferably about 100° to 200° C., and more preferably about 100° to 150° C. Conventional external heating means may, if needed, be provided to maintain the desired temperature. However, the discharge reaction is usually sufficiently exothermic to maintain the desired temperature range in the cell during its operation.

In accordance with the invention, the organo-sulfur compound which comprises the novel positive electrode of the invention is characterized by an organo-sulfur material having at least one sulfur atom which forms a first bond with an organic moiety and a second bond, when the material is in its charged state, with another sulfur atom which is also bonded to an organic moiety. When the compound is in its discharged state, the sulfur-sulfur bond is broken and a metal ion, such as sodium, forms a salt with each of the resulting organo-sulfur anions.

Thus, the positive electrode material comprises an organo-sulfur material which includes the basic or backbone formula R—S—. In its charged state, the sulfur atom (or atoms, as will be explained below) forms a —S—S— bond with a sulfur atom of another R—S— group forming R—S—S—R. Upon discharge, the S—S— bond is broken and each R—S— group forms a salt with a metal ion such as, for example, sodium, i.e., R—S—Na.

The R group, representing an organic moiety, as will be explained below, may also have sulfur atoms bonded thereto by double bonds, i.e., R=S, as well as the sulfur atoms just described. The R group may also have more than one sulfur atom bonded thereto by single bonds thus making polymerization possible, for example in the case of —S—R—S—. Branching may also occur when the R group has three or more of such sulfur atoms single bonded thereto.

Therefore, the general formula for the organo-sulfur material comprising the novel positive electrode of the invention, may be written, in its charged state, as: $(R(S)_y)_n$ wherein $y=1$ to 6; $n=2$ to 20; and R is one or more of the same or different aliphatic or aromatic organic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon.

Thus, the simplest case, R—S—S—R, is represented in the above general formula where $y=1$ and $n=2$, i.e., $(RS)_2$. Where each R group also has a double bonded sulfur atom thereon as well, the organo-sulfur compound will have the formula (when the positive electrode is in the charged state) of:

For this compound, y and n, in the general formula above, each will have a value of 2, i.e., $(R(S)_2)_2$.

When n in the general formula $(R(S)_y)_n$ is greater than 2, at least some of the organo-sulfur positive electrode material comprises organic moieties containing more than one sulfur atom, attached to the same organic moiety, and capable of forming a sulfur-sulfur bond with a sulfur attached to another organic moiety. Thus, in its charged state, a polymer-like material may be formed with the length of the polymer depending upon the presence of impurities or chain stoppers such as mono sulfide organic moieties, e.g., $CH_3$—$CH_2$—S—Na, to terminate polymerization. Such a polymer, for example, could comprise a linear aliphatic chain having such a sulfur atom at each end of the chain, e.g., —S—$CH_2CH_2$—S—, permitting the formation of dimers, oligomers, etc. such as, —S—$CH_2$—$CH_2$—S—S—$CH_2$—$CH_2$—S—S—$CH_2$—$CH_2$—S—, corresponding to the general formula $(R(S)_2)_3$.

Similarly, the organo-sulfur compounds may comprise branched polysulfide materials containing more than two sulfurs capable of forming sulfur-sulfur bond with adjacent sulfur atoms on other organo-sulfur materials. For example, when each R group contains three sulfur atoms capable of forming sulfur-sulfur bonds, the general formula could be written as $(R(S)_3)_n$.

Thus, y has been given a value of 1 to 6 in the general formula in recognition of both the possibility of the existence of double bonded sulfur atoms on the R group, as discussed above, as well as the presence of more than one sulfur atom thereon capable of forming sulfur-sulfur bonds with similar sulfur atoms on other molecules. The value of n, in the general formula, while usually 2, has been given a range of up to 20 in recognition of the possibility of polymerization, as just discussed. While it would, of course, be possible for even further polymerization to occur, the formation of high molecular weight polymerization, i.e., formation of long (or highly branched) chains, is not deemed to be desirable.

Despite the possibility of many forms of the organo-sulfur compound comprising the positive electrode material of the invention, as discussed above, the preferred form is the simple dimer discussed above represented by the formula R—S—S—R, or, in the general formula, as $(R(S)_1)_2$, i.e., $(RS)_2$.

By way of example, and not of limitation, the organic moiety R, when it comprises a straight or branched aliphatic chain, may comprise an alkyl, alkenyl, alkynyl, alkoxyalkyl, alkylthioalkyl, or aminoalkyl group, including fluorine substituted derivatives of such groups. When the organic moiety comprises an aromatic group, the group may comprise an aryl, aralkyl, or alkylaryl, including fluorine substituted derivatives, and the ring may also contain one or more nitrogen, sulfur, or oxygen heteroatoms in the ring as well.

Generally speaking, any organic moiety may be used to form the organo-sulfur compound of the positive electrode provided that the resulting compound is thermally stable, i.e., does not decompose at the operating temperature; and that the compound exhibit satisfactory voltage properties. By the latter is meant that the resulting cell should exhibit a voltage, during a discharge rate of at least about 2 milliamps per $cm^2$ of electrolyte area, of at least 1.8 volts up to about 2.5 volts. Furthermore, the cell should not exhibit overvoltages of 1 volt or higher during subsequent charge-discharge cycles, for example, at 5 milliamps/$cm^2$ of electrolyte at 100° C. or 0.5 milliamps/$cm^2$ of electrolyte when operating at room temperature. When a liquid positive electrode is to be used, the organo-sulfur material (i.e., the material in charged form) should further be capable of forming a salt with the metal anode (the discharged form) which is dissolvable in the liquid organo-sulfur material or dissolvable in a solution of organo-sulfur material and a suitable solvent such as dimethyl sulfoxide, dimethylacetamide, tetraethylsulfamide, etc.

It should be further noted that all of the R groups need not be identical. Thus, the organo-sulfur compound for the simple dimer could be written as R—S—S—R' to illustrate the case wherein R and R' are different organic moieties falling within the general definition already discussed. Similarly, when the R or R' groups also contains a double bonded sulfur atom as well, the formula for the simple dimer may be written as RSS—SSR' (or RCSS—SSCR' where R and R' may have 1–19 carbon atoms) to indicate that R and R' are different.

The nature of the organic moiety will affect both the physicochemical properties of the resulting cathode, e.g., the melting point, etc., as well as the electrochemical properties, (redox potential) of the molecule. For example, the presence of electron withdrawing groups, such as oxygen or fluorine will have an effect upon the —S—S— bond which forms when the cathode is in the charged state (as will be described in more detail below) increasing the oxidizing character of the organic compound and probably increasing the dielectric constant of the liquid as well. For example, the open circuit voltage of a $Na/C_6H_5$—S—S—$C_6H_5$ cell is 2.0 volts whereas the open circuit voltage of a $Na/FC_6H_4$—S—S—$C_6H_4F$ cell is about 2.4 volts.

Particular examples of organic-sulfur compounds which have been found to be effective in the formation of satisfactory positive electrodes in electrochemical cells include organic-sulfur compounds in the general formula $(R(S)_y)_n$ wherein R comprises methyl groups having the formula —$CH_3$, hydroxy ethyl groups having the formula: —$CH_2$—$CH_2OH$, dialkylaminothio groups having the formula:

diaromaticamino groups having the formula:

aromatic groups such as $C_6H_5$—, and fluorinated aromatic groups such as $FC_6H_4$—.

As stated above, the organo-sulfur cathode material of the invention, in its fully charged state, has the formula, in its simplest form, R—S—S—R or $(RS)_2$; with the important feature being the formation of the sulfur-sulfur bond upon oxidation of the alkali metal thio salt. In the discharged state, the sulfur-sulfur bond is broken and the metal salt, e.g., RSNa is formed. Thus, the half cell reaction that occurs at the positive electrode during charging may be illustrated (using sodium by way of example as the metal ion) as follows:

or, when the R groups are not the same,

At the negative electrode, the corresponding half cell reaction during charging is represented as:

When more than one bondable sulfur is bonded to the R group, the half cell reaction at the positive electrode during charging may be written as:

The corresponding half cell reaction at the anode during charging can then be written as:

In order to provide good electrical conductivity between the positive electrode and the metal container, preferably an electronically conductive matrix of, for example, carbon or aluminum fibers is dispersed throughout the positive electrode material Such fibers must be chemically resistant to the materials comprising the positive electrode. Preferably, such material comprise graphite felt such as, for example, Felt GF-S6, a graphite felt commercially available from the Electrosynthesis Company of East Amherst, N.Y. Carbon powder may also be used. However, when the positive electrode is to be used in liquid form, fibers are preferred over powders because of the tendency of powders to settle out of the liquid.

As discussed above, to provide both good electronic and ionic transport through the positive electrode material, the cathode material preferably should be in liquid form. If necessary to maintain the cathode material in liquid form, an aprotic solvent may be used such as, for example, sulfolane, dimethylacetamide, dimethyl sulfoxide, tetramethylurea, N-methylpyrrolidinone, or tetraethylsulfamide. To further improve the performance of the positive electrode, compounds which act as electrocatalysts for the cathode material may also be added to reduce the charge transfer resistance of the molten cathode material, such as, for example, a metallo organic complex. Examples of such an additive are a copper thio organic compound having the general formula $Cu(SR)_2$, wherein R equals any organic moiety or the metal phthlocyanines (PMcs), such as cobalt phthalocyanine (CoPc) or manganese phthalocyanine (MnPc).

The following will serve to further illustrate the invention.

Thirty cells were constructed using tetraethylthiuram disulfide (TETD) as the positive electrode (cathode) material and sodium as the negative electrode material. The overall reaction for a cell based on this couple is:

wherein R=an ethyl group.

The theoretical energy density of a Na/TETD cell is 360 Whrs/Kg. Pure TETD melts at approximately 74° C., while its corresponding anhydrous salt, sodium diethyldithiocarbamate (NaDEDC) has a melting point of about 145° C. The sodium salt has an appreciable solubility in the TETD at 130° C. of about 60 wt. %. This was increased to about 90 wt. % by the addition of 10 wt. % of DMSO, a high dielectric constant solvent, to the TETD for some of the cells. Higher amounts of DMSO, up to 20 wt. %, were added to some of the cells to lower the melt viscosity and increase the molecular transport of the TETD molecules to allow higher discharge rates.

Four grams of sodium anode material was loaded into a 10 mm diameter beta″ alumina tube having a length of 10 cm which served as the solid electrolyte for the cell. The beta″ alumina tube was formed with an integral bottom and the top of the tube was sealed using an aluminum cap which was secured to the beta″ alumina tube with an epoxy sealant. The sealed beta″ alumina tube was then loaded into a 17 mm diameter aluminum tube and a high surface area graphite felt (GF-S6 from Electrosynthesis company) was placed in the space between the solid electrolyte tube and the aluminum outer tube to provide an electrolyte surface area in contact with the felt of about 20 to 25 cm$^2$. TETD portions of 13 grams each were then loaded into each aluminum tube. The aluminum tube was then sealed with a metal cover member which permitted a lead from the inner anode to pass therethrough in electrical insulation from the outer cap.

The available capacities for the thirty cells so assembled ranged from about 2.0 to about 2.5 ampere-hour (Ahr) while the respective masses of the cells ranged from about 50 to about 53 grams resulting in maximum practical energy densities of about 90 to about 110 Whrs/Kg at zero current drain (OCV=2.3 volts). The internal resistance of the laboratory cells ranged from 0.5 to 2.0 ohms, 0.025 to 0.10 ohms/cm$^2$, which varied somewhat with art of assembly, state of charge, and current load.

The cells were cycled between 10 and 90% of available capacity at current densities of 5 mA/cm$^2$, achieving power densities of up to 6 W/Kg at an average closed circuit voltage of 2.0 volts, overall energy efficiencies of charge/discharge cycling of 75%. and actual energy densities of 80 Whr/Kg.

Figure 2:
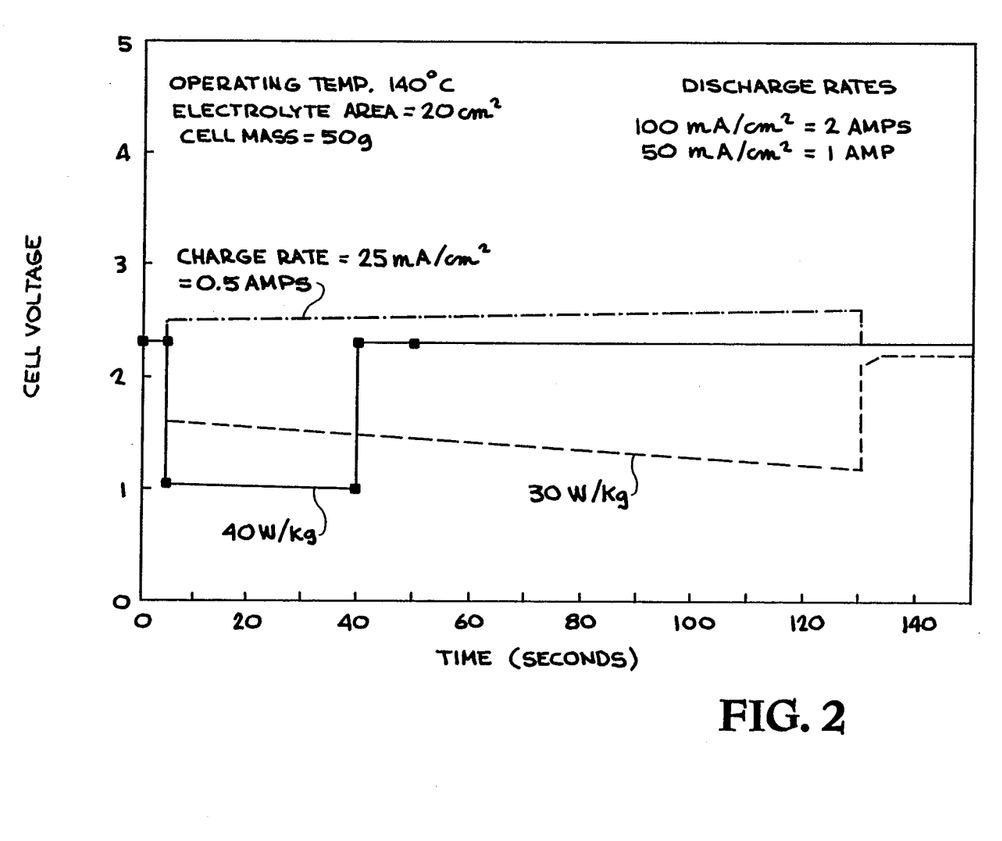
FIGS. 2-4 are graphs showing the operating conditions of cells constructed in accordance with the invention.
Figure 3:
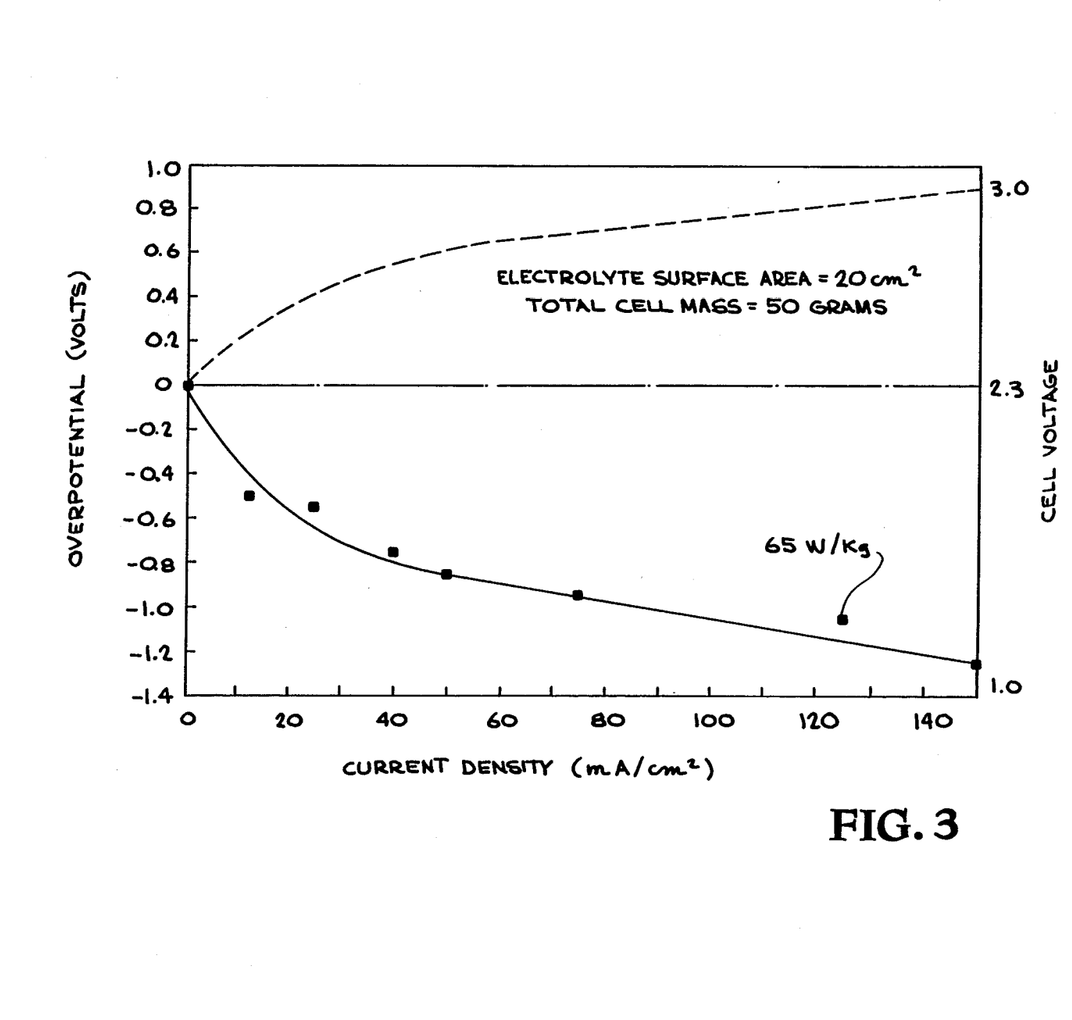
Figure 4:
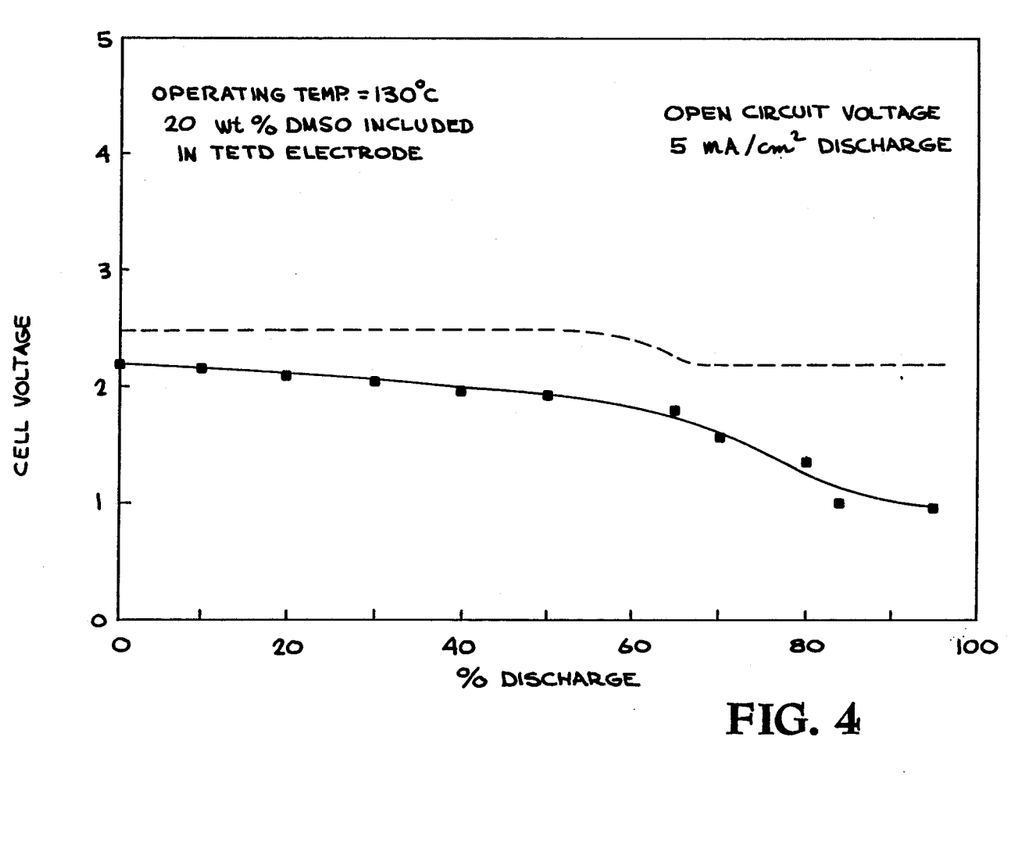

The results of these tests are shown in FIGS. 2 and 3 which indicate that a number of cells were capable of delivering current densities of over 100 mA/cm$^2$ (2 Amps) at 1 volt for a period of a minute or more, or 25 mA/cm$^2$ at 1.5 volts nominal for 8% of available capacity. For discharge depths of greater than 60% of capacity, the presence of 10 to 20 wt. % solvent in the positive electrode reduced polarization losses, as shown in FIG. 4, presumably by preventing precipitation of Na-DEDC and increasing diffusion rates by lowering the melt viscosity.

Similar results have also been achieved using diethoxydisulfide having the formula HO—CH$_2$CH$_2$—S—S—CH$_2$CH$_2$—OH as the charged positive electrode material which becomes 2 HO—CH$_2$CH$_2$—SNa in the discharged state.

While a specific embodiment of the novel metal-sulfur type cell containing the organo-sulfur cathode of the invention has been illustrated and described, in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A novel metal-sulfur type cell containing an organo-sulfur material consisting essentially as the positive electrode material wherein said organo-sulfur positive electrode material is further characterized by a sulfur-sulfur bond, when in the charged state, which, upon discharge of the positive electrode, is broken to form an organo-sulfur metal salt with metal ions in said cell.

2. A novel metal-sulfur type call capable of operating at a temperature of 200° C. or lower and providing an energy density of 150 Whrs/Kg or higher comprising a metal negative electrode and an organo-sulfur positive electrode consisting essentially of a material having the general formula, in its charged state, of $(R(S)_y)_n$ wherein $y=1$ to 6; $n=2$ to 20; and R is one or more different aliphatic or aromatic organic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon and wherein said organo-sulfur positive electrode material is further characterized by a sulfur-sulfur bond, when in the charged state, which, upon discharge of the cell, is broken to form an organo-sulfur metal salt with metal ions in said cell.

3. The novel metal-sulfur type cell of claim 2 wherein said organo-sulfur positive electrode material has the general formula, in its charged state, of $(R(S)y)_2$ wherein $y=1$ to 6; and R is one or more different aliphatic or aromatic organic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic branch or the aromatic ring may have substituted groups thereon.

4. The novel metal-sulfur type cell of claim 2 wherein said organo-sulfur positive electrode material has the general formula, in its charged state, of RCSS—SSCR′ wherein R and R′ are the same or different aliphatic or aromatic organic moieties having 1 to 19 carbon atoms, which may include one or more oxygen, sulfur, or nitrogen heteroatoms when R and/or R′ comprises one or more aromatic rings, or one or more oxygen, sulfur, nitrogen, or fluorine atoms associated with the chain when R and/or R′ comprises an aliphatic chain, wherein the aliphatic group may be linear or branched, saturated or unsaturated, and wherein either the aliphatic branch or the aromatic ring may have substituted groups thereon.

5. The novel metal-sulfur type cell of claim 2 wherein said organo-sulfur positive electrode material has the general formula, in its charged state, of RS—SR′ wherein R and R′ are the same or different aliphatic or aromatic organic moieties having 1 to 20 carbon atoms, which may include one or more oxygen, sulfur, or nitrogen heteroatoms when R and/or R′ comprises one or more aromatic rings, or one or more oxygen, sulfur, nitrogen, or fluorine atoms associated with the chain when R and/or R′ comprises an aliphatic chain, wherein the aliphatic group may be linear or branched, saturated or unsaturated, and wherein either the aliphatic branch or the aromatic ring may have substituted groups thereon.

6. The novel metal-sulfur type cell of claim 2 wherein said cell is operated at a temperature of 200° C. or less and said organo-sulfur positive electrode material is a liquid at the operating temperature.

7. The novel metal-sulfur type cell of claim 6 wherein said organo-sulfur positive electrode material is dissolved in an aprotic solvent.

8. The novel metal-sulfur type cell of claim 7 wherein said organo-sulfur positive electrode material is dissolved in an aprotic solvent selected from the class consisting of sulfolane, dimethyl sulfoxide, dimethylacetamide, tetramethylurea, N-methylpyrrolidinone, and tetraethylsulfamide.

9. The novel metal-sulfur type cell of claim 6 wherein said organo-sulfur positive electrode also includes a metallo organic complex material capable of functioning as an electrocatalyst with said cathode material to improve the charge transfer resistance of the liquid cathode material.

10. The metal-sulfur type cell of claim 6 wherein said liquid organo-sulfur cathode material has dispersed therein an electronically conductive matrix of a fibrous solid material which is chemically resistant to said organo-sulfur material.

11. The metal-sulfur type cell of claim 10 wherein said electronically conductive matrix of fibrous materials dispersed through said organo-sulfur positive electrode material is selected from the class consisting of carbon and aluminum fibers.

12. The novel metal-sulfur type cell of claim 2 wherein said cell has a solid electrolyte which separates said organo-sulfur positive electrode from said negative electrode.

13. The novel metal-sulfur type cell of claim 12 wherein said solid electrolyte separating said organo-sulfur positive electrode from said negative electrode comprises a beta alumina material.

14. The novel metal-sulfur type cell of claim 2 wherein said negative electrode comprises a material selected from the class consisting of one or more alkali metals and a mixture of one or more alkali metals and one or more alkaline earth metals.

15. The novel metal-sulfur type cell of claim 14 wherein said negative electrode comprises a material selected from the class consisting of sodium, a mixture of sodium with one or more additional alkali metals, a mixture of sodium with one or more alkaline earth metals, and a mixture of sodium with one or more alkali metals and one or more alkaline earth metals.

16. The novel metal-sulfur type cell of claim 14 wherein said negative electrode comprises a material selected from the class consisting of lithium, a mixture of lithium with one or more additional alkali metals, a mixture of lithium with one or more alkaline earth metals, and a mixture of lithium with one or more alkali metals and one or more alkaline earth metals.

17. The novel metal-sulfur type cell of claim 14 wherein said negative electrode comprises a mixture of lithium and sodium.

18. An novel metal-sulfur type cell capable of operating at a temperature of 150° C. or less and providing an energy density of 200 Whrs/Kg or better comprising:
(a) a positive electrode consisting essentially of a liquid organo-sulfur positive electrode material having the general formula, in its charged state, of $(R(S)_y)_n$ wherein $y=1$ to 6; $n=1$ to 20; and R is one or more different aliphatic or aromatic organic moieties having 1 to 20 carbon atoms, which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon and wherein said organo-sulfur positive electrode material is further characterized by a sulfur-sulfur bond, when in the charged state, which, upon discharge of the cell, is broken to form an organo-sulfur metal salt with metal ions in said cell;
(b) a solid negative electrode comprising a material selected from the class consisting of one or more alkali metals and a mixture of one or more alkali metals and one or more alkaline earth metals; and
(c) a solid electrolyte separating said organo-sulfur positive electrode from said negative electrode comprising a beta alumina material.

19. The metal-sulfur type cell of claim 18 wherein said negative electrode includes sodium.

20. A novel metal-sulfur type cell capable of operating at a temperature of 200° C. or lower and providing an energy density of 150 Whrs/Kg or higher comprising a metal negative electrode and a positive electrode consisting essentially of a organo-sulfur positive electrode material having the general formula, in its charged state, of R—S—S—R' wherein R and R' consist essentially of the same or different aliphatic or aromatic organic moieties having 1 to 20 carbon atoms, which may include one or more oxygen, sulfur, or nitrogen heteroatoms when R or R' comprises one or more aromatic rings, or one or more oxygen, sulfur, nitrogen, or fluorine atoms associated with the chain when R or R' comprises an aliphatic chain, wherein the aliphatic group may be linear or branched, saturated or unsaturated, and wherein either the aliphatic chain or the aromatic ring may have substituted groups thereon and wherein the sulfur-sulfur bond of said organo-sulfur positive electrode material in the charged state is broken, upon discharge of the cell, to form the organo-sulfur metal salt with metal ions in said cell having the formula R—S—M or R'—S—M wherein M equals metal ions in said cell.

21. The novel metal-sulfur type cell of claim 20 wherein said negative metal electrode comprises a material selected from the class consisting of one or more alkali metals and a mixture of one or more alkali metals and one or more alkaline earth metals.

22. The novel metal-sulfur type cell of claim 21 wherein said negative electrode comprises a material selected from the class consisting of sodium, a mixture of sodium with one or more additional alkali metals, a mixture of sodium with one or more alkaline earth metals, and a mixture of sodium with one or more alkali metals and one of more alkaline earth metals.

23. The novel metal-sulfur type cell of claim 21 wherein said negative metal electrode comprises a material selected from the class consisting of lithium, a mixture of lithium with one or more additional alkali metals, a mixture of lithium with one or more alkaline earth metals, and a mixture of lithium with one or more alkali metals and one or more alkaline earth metals.

24. The novel metal-sulfur type cell of claim 20 wherein said R or R' groups in said organo-sulfur positive electrode material are selected from the group consisting of methyl groups, hydroxy ethyl groups, dialkylaminothio groups, diaromaticamino groups, aromatic groups, and fluorinated aromatic groups.

* * * * *